(12) United States Patent
Loeuillet

(10) Patent No.: US 6,717,510 B1
(45) Date of Patent: Apr. 6, 2004

(54) TELECOMMUNICATIONS TERMINAL WHICH COMMUNICATES WITH TELECOMMUNICATIONS TERMINALS CONNECTED IN PARALLEL TO THE SAME NETWORK TERMINATION

(75) Inventor: Patrick Loeuillet, Strasbourg (FR)

(73) Assignee: Alcatel, Paris (FR)

( * ) Notice: Subject to any disclaimer, the term of this patent is extended or adjusted under 35 U.S.C. 154(b) by 700 days.

(21) Appl. No.: 09/635,788

(22) Filed: Aug. 11, 2000

(30) Foreign Application Priority Data

Aug. 13, 1999 (EP) ............................................. 99440224

(51) Int. Cl.$^7$ ............................................. H04M 11/04
(52) U.S. Cl. ............................ 340/310.01; 340/310.02; 370/458
(58) Field of Search ........................ 340/310.01, 310.02, 340/310.05, 310.06; 370/271, 286, 295, 458, 489

(56) References Cited

U.S. PATENT DOCUMENTS

| | | | | |
|---|---|---|---|---|
| 4,475,193 A | * | 10/1984 | Brown | 340/310.01 |
| 5,825,777 A | * | 10/1998 | Komarek et al. | 370/458 |
| 5,937,342 A | * | 8/1999 | Kline | 455/402 |
| 6,040,759 A | * | 3/2000 | Sanderson | 340/310.01 |

* cited by examiner

Primary Examiner—Van Trieu
(74) Attorney, Agent, or Firm—Sughrue Mion, PLLC

(57) ABSTRACT

A plurality of telecommunications terminals is connected to a network termination of a subscriber. Each of the telecommunications terminals has an interface to the subscriber's in-house power line and is addressable via an individual identification signal. The telecommunications terminals both generate and detect control signals that are transferred over the power line. Such a telecommunications terminal can establish through the power line an alternative call to another telecommunications terminal connected to the subscriber's network termination.

20 Claims, 4 Drawing Sheets

TELECOMMUNICATIONS TERMINAL WHICH COMMUNICATES WITH TELECOMMUNICATIONS TERMINALS CONNECTED IN PARALLEL TO THE SAME NETWORK TERMINATION

BACKGROUND OF THE INVENTION

This invention relates to a telecommunications terminal for connection to a network termination of a subscriber and to a telecommunications network comprising a number of telecommunications terminals connected in parallel to a network termination of a subscriber.

EP 98 440 104.2, which has not been published yet, discloses a telecommunications network comprising telecommunications terminals connected in parallel to a single network termination of a subscriber. Although only a single exchange line is present, an external subscriber can selectively call a telecommunications terminal implemented as, e.g., a telephone. Only this telecommunications terminal will then ring. To make this possible, each telecommunications terminal is identified by an identification signal. This identification signal generally forms part of the calling line identification, which is transmitted to the called subscriber terminal after the ringing pulse alerting signal. The telecommunications terminals of the telecommunications network are provided with means for detecting and generating such identification signals. These means generally include a modem which can demodulate the identification signal and passes the demodulated signal on to a processor. After a logic operation, such as a comparison between the demodulated identification signal and the preset, individual identification signal of the telecommunications terminal, it is determined whether the incoming call is destined to this terminal. Only if that is the case will an audible alarm signal be generated in the terminal. Because of the presence of the modem, it is necessary to additionally supply such telecommunications signals with current.

EP 98 440 104.2 deals only with the detection of the individual identification signals. Unlike a digital network termination, such as an ISDN network termination, a transfer of a call existing between an external subscriber and a first telecommunications terminal connected to this analog network termination to a second telecommunications terminal of the telecommunications network is not possible despite the use of individual identification signals. If the external subscriber has dialed the number of the wrong terminal of the telecommunications network by mistake, the call cannot be transferred from that terminal to the desired terminal. Generally, the sole assignment of individual identification signals will not suffice to achieve a performance similar to that obtained with an ISDN network termination, where in addition to the two bearer channels (B channels) for the transmission of user information, a third channel (D channel) is provided for the transmission of control signals.

SUMMARY OF THE INVENTION

It is an object of the invention to improve a telecommunications terminal of the above kind and a telecommunications network of the above kind in such a way that the use of several such terminals which are addressable via the same analog network termination becomes more convenient. Another object is to fully utilize the advantages of telecommunications terminals identified by individual identification signals.

These objects are attained by a telecommunications terminal for connection to a network termination of a subscriber, comprising an interface to the subscriber's in-house power line and addressable via an individual identification signal, wherein the telecommunications terminal further comprises means for generating and detecting control signals which are transferred over the power line to permit the establishment of a call to a further telecommunications terminal connected to the subscriber's network termination. The objects are further attained by a telecommunications network comprising a number of telecommunications terminals, wherein at least one of the telecommunications terminals comprises means for generating and detecting such control signals.

The use of the subscriber's in-house power line to transfer control signals between the telecommunications terminals connected in parallel to the network termination makes it possible to establish a call between two telecommunications terminals without having to terminate an existing call with a subscriber external to the network termination. The existing modem for detecting the individual identification signals is additionally used to generate and/or detect the control signals for setting up a call to a further terminal connected to the subscriber's network termination. The modem itself is controlled by a processor which controls the generation and/or detection of the control signals in accordance with an activatable/deactivatable instruction set.

These instruction sets are advantageously stored in a volatile memory and can be activated by the subscriber if required, for example via a keypad.

With the aid of these control signals, a subscriber at, e.g., one of the telephones connected to the network termination can interrogate a second telephone connected to the network termination for its operating data and, if necessary, change these data. This may be particularly advantageous if two or more telecommunications terminals are connected to the same exchange line. If such terminals are in two different rooms, for example, and one of them includes an answering machine, a subscriber can check from one of the rooms whether a message was recorded on the answering machine in the second room. Besides permitting remote access to answering machine messages, this also makes it possible to adapt some operating data, for example to change a recorded announcement, without having to be in the same room.

Instead of obtaining remote access to an answering machine, a telecommunications terminal serving as a fax machine or a computer (PC) and connected to the network termination can be interrogated for its status and/or the status can be changed.

The transfer of control signals over the in-house power line to establish a call between two telecommunications terminals connected to the same network termination is ideally suited to fully utilizing the advantages of an existing telecommunications network in which all telecommunications terminals are addressable on an individual basis.

Advantageously, a telecommunications terminal as disclosed in EP 98 440 104.2 can be retrofitted with activatable/deactivatable instruction sets for controlling the modem. These instruction sets may be stored centrally in a memory of one of the terminals of the telecommunications network, for example in a nonvolatile memory of a PC. They are then available to all telecommunications terminals via the in-house power line. The instruction sets can be loaded into the PC like a software package, i.e., they can be read from a storage medium via the disk drive of the PC and stored in the nonvolatile memory of the latter.

BRIEF DESCRIPTIONS OF THE DRAWINGS

Further advantageous features of the invention will become apparent from the dependent claims, the following description, and the accompanying drawings.

One embodiment of the invention will now be explained in more detail with reference to the accompanying drawings, in which.

DETAILED DESCRIPTION OF THE INVENTION

Figure 1:
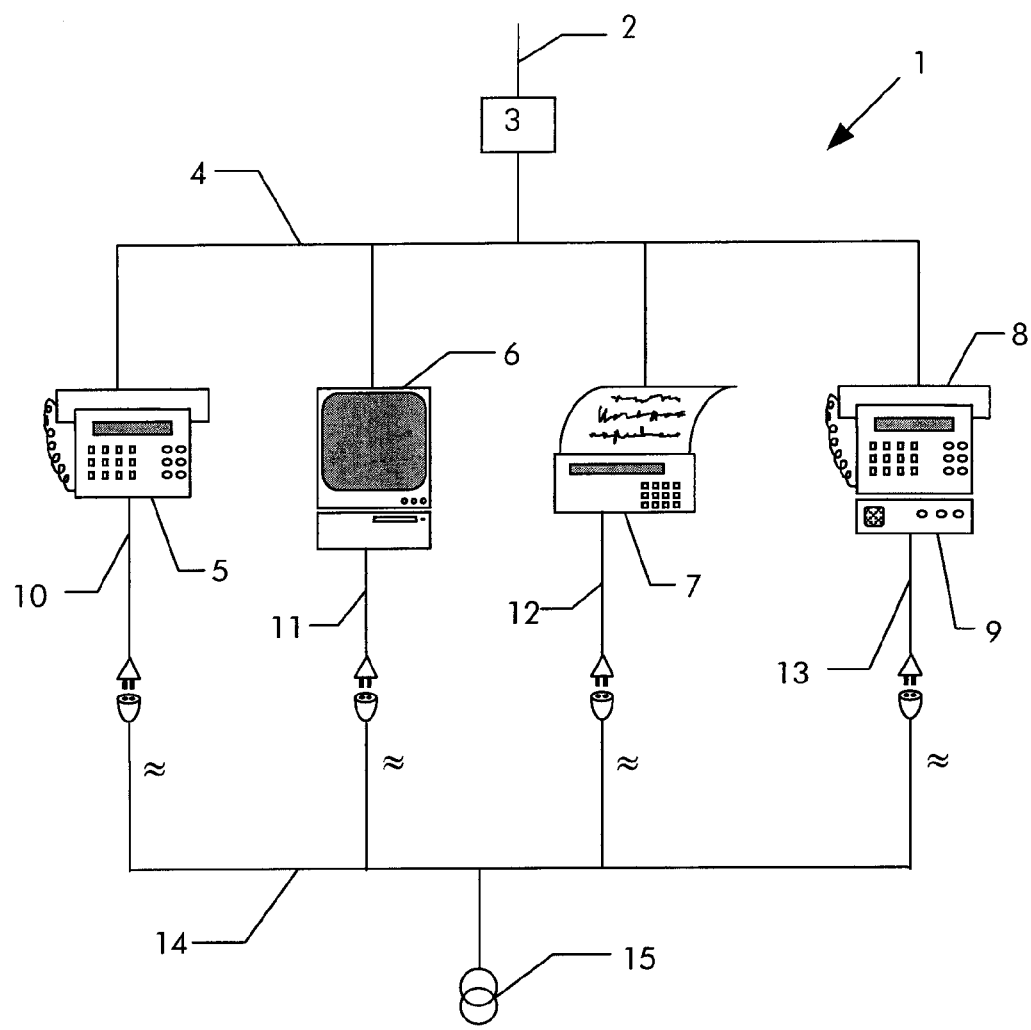
FIG. 1 is a schematic of a telecommunications network connected to an analog network termination.

The telecommunications network 1 shown schematically in FIG. 1 is connected to an analog network termination 3. The network termination 3 is connected via an exchange line 2 to the public switched telephone network. The telecommunications network 1 comprises several telecommunications terminals 5 to 9 which are connected in parallel to the network termination 3 via a telephone line 4. All telecommunications signals 5 to 9 are supplied with current via respective power cables 10 to 13. The respective power cables 10 to 13 are connected to the in-house power line 14, which is supplied with current from outside via an electric power meter 15.

The individual telecommunications terminals 5 to 9 are a telephone 5, a computer (PC) 6, a fax machine 7, and an additional, second telephone 8 with a telephone answering set 9.

Each of the telecommunications terminals 5 to 9 is assigned an individual identification signal according to EP 98 440 104.2, so that a subscriber external to the network termination 3 can selectively address one of the telecommunications terminals 5 to 9 of the telecommunications network 1. If a single analog exchange line 2 is present, this is possible if the service provider (e.g., Deutsche Telekom) assigns not only one telephone number per exchange line, but, possibly for a certain extra charge, additional, virtual telephone numbers. It then rests with the owner of the telecommunications network 1 to determine which telephone number to assign to which telecommunications terminal.

Figure 2:
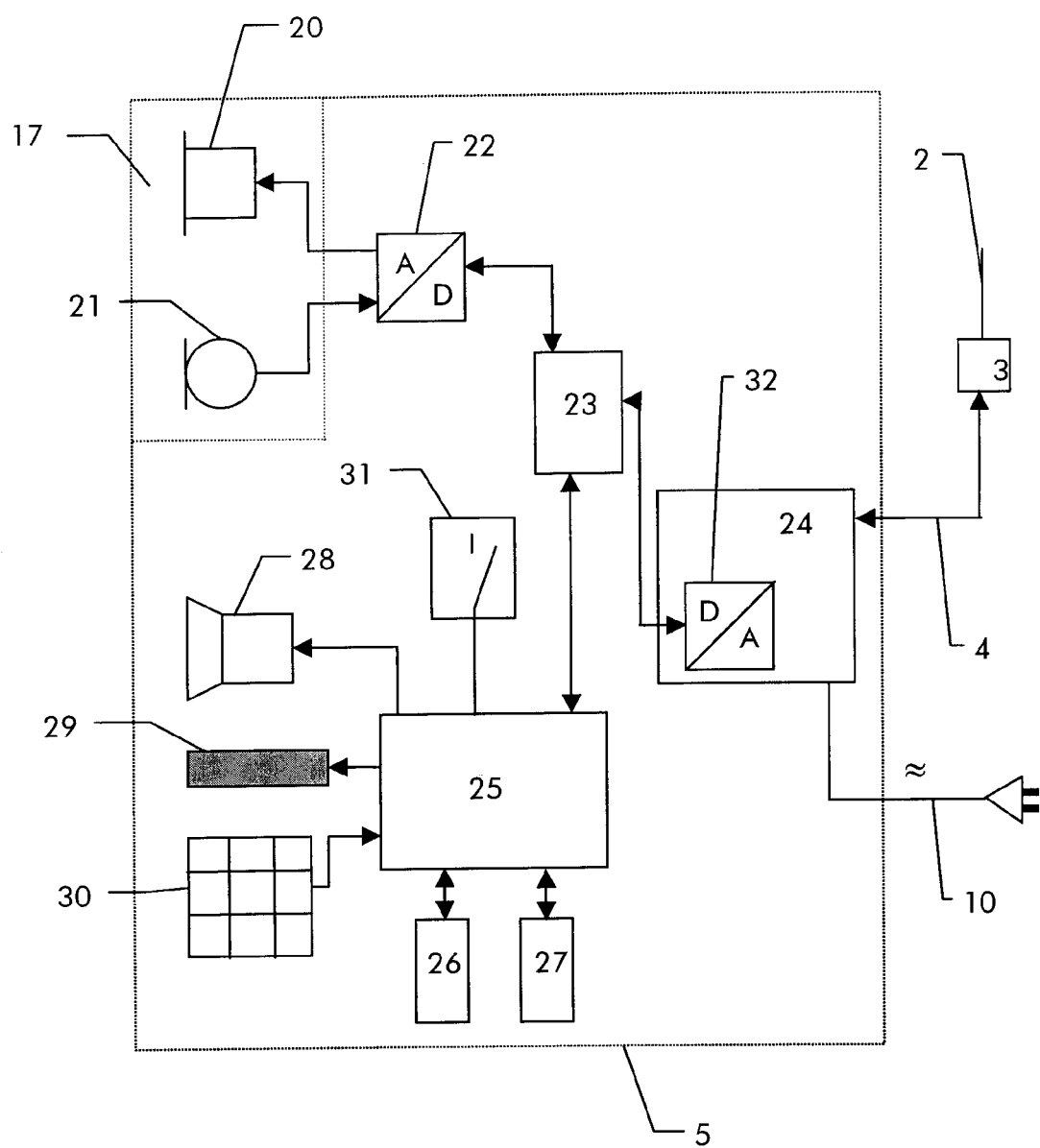
FIG. 2 is a schematic block diagram of a telecommunications terminal of the telecommunications network of FIG. 1, implemented as a telephone terminal.

FIG. 2 is a schematic block diagram of the telephone 5 of the telecommunications network 1 of FIG. 1. The telephone 5, like all other telecommunications terminals 6 to 9, is connected via the telephone line 4 and the network termination 3 to the exchange line 2. The telephone line 4 is connected to a modem 24 incorporated in the telephone 5. In the modem 24, the signals received from the telephone line 4 are demodulated and fed to a functional block 32, where they are digitized. The digitized signals from the modem 24 are applied through a functional unit 23 to a microprocessor 25. In the microprocessor 25, the signals are processed according to predefined algorithms, and lead to different results according to the information contained in the signals.

The telephone 5 further includes a second functional block 22, which contains means for converting the digital data provided by the functional unit 23 into analog signals. The analog signals are conveyed to a handset 17 comprising a receiver 20 which outputs the analog signals as audible signals. Conversely, the analog signals picked up by a microphone 21 are subjected to an analog-to-digital conversion by the functional block 22 and passed as digital signals to the functional unit 23.

Also coupled to the microprocessor 25 are a hookswitch 31, a loudspeaker 28 for hands-free operation, a display 29, and an input device.(keypad) 30. Signals generated by the input device 30 or the hookswitch 31 are converted by the microprocessor 25. These signals are passed through the functional unit 23 to the functional block 32 of the modem 24. In addition to nonvolatile memory means 26, in which programs and data for operating the telecommunications terminal 5 are stored, volatile memory means 27 are coupled to the microprocessor 25. The volatile memory means 27 (random-access memory) serve as a main memory.

Figure 3:
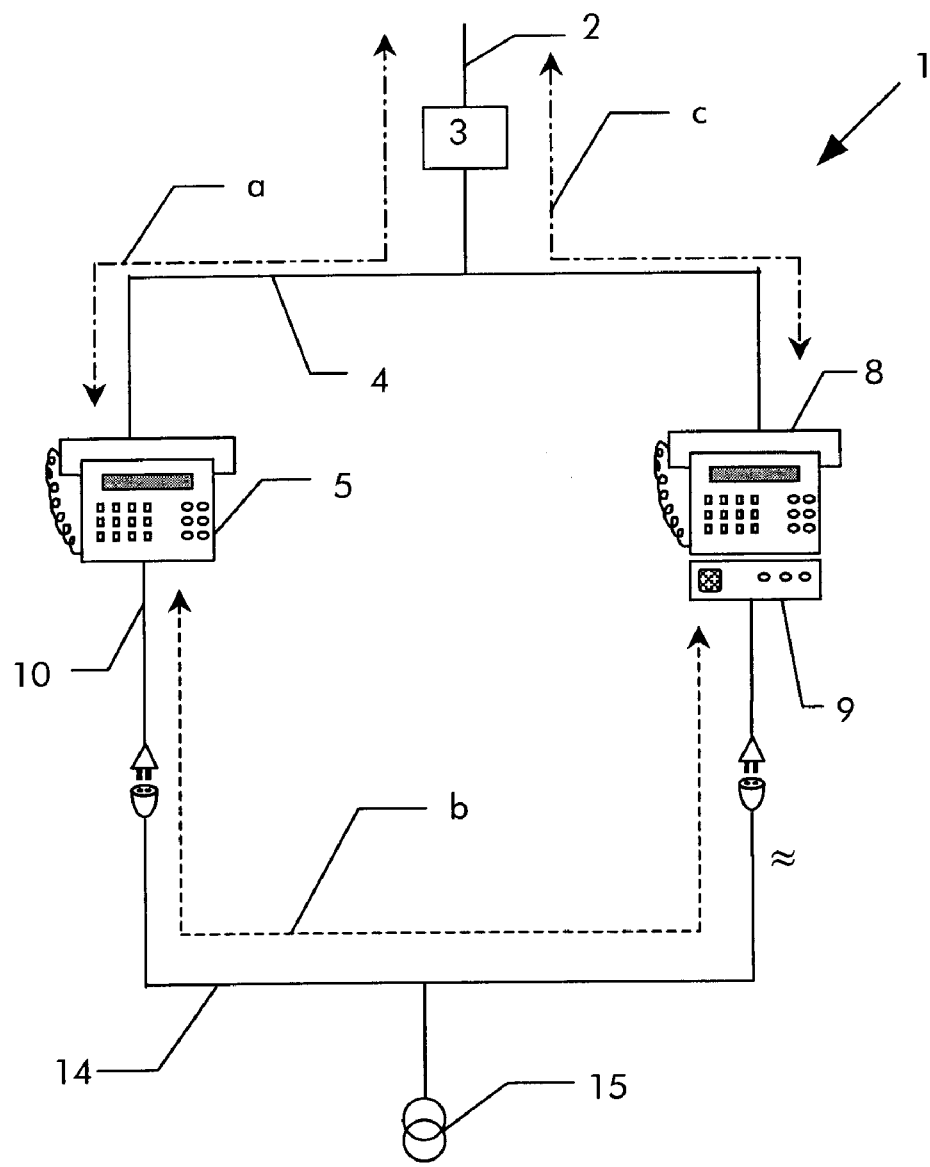
FIG. 3 is a schematic of a first variant of the telecommunications network of FIG. 1.

As shown in FIG. 3, the subscriber at the telecommunications terminal 5 can transfer a call "a" existing between him/her and an external subscriber to another telecommunications terminal connected in parallel to the same network termination 3, in this case the telephone 8 or the telephone answering set 9. To do this, the subscriber will enter the individual identification number of the second telecommunications terminal 8 or 9 through the input device 30. This identification number is processed by the processor 25 in accordance with predefined instruction sets, and results in the generation of control signals "b", which are transferred from the modem 24 over the power cable 10 and the in-house power line 14 and are thus distributed to all telecommunications terminals connected to this power line. The control signals may contain the dialed individual identification number. The addressed second telecommunications terminal 8 or 9, e.g., the telephone 8, receives these control signals over its power cable 13. In this telephone 8, a modem similar to that in telephone 5 converts the control signals, and its output is applied through a functional unit to a processor. If it is determined by a comparison with predefined signals that these converted control signals contain the identification number of the telephone 8, a ringing sound will be emitted by a loudspeaker. In addition, information such as the number and/or name of the calling subscriber may be presented on a display. The subscriber at telephone 8 may or may not accept the call. If he/she accepts it, the call a will be transferred to telephone 8. A new call "c" is thus completed between the external subscriber and the subscriber at telephone 8.

Figure 4:
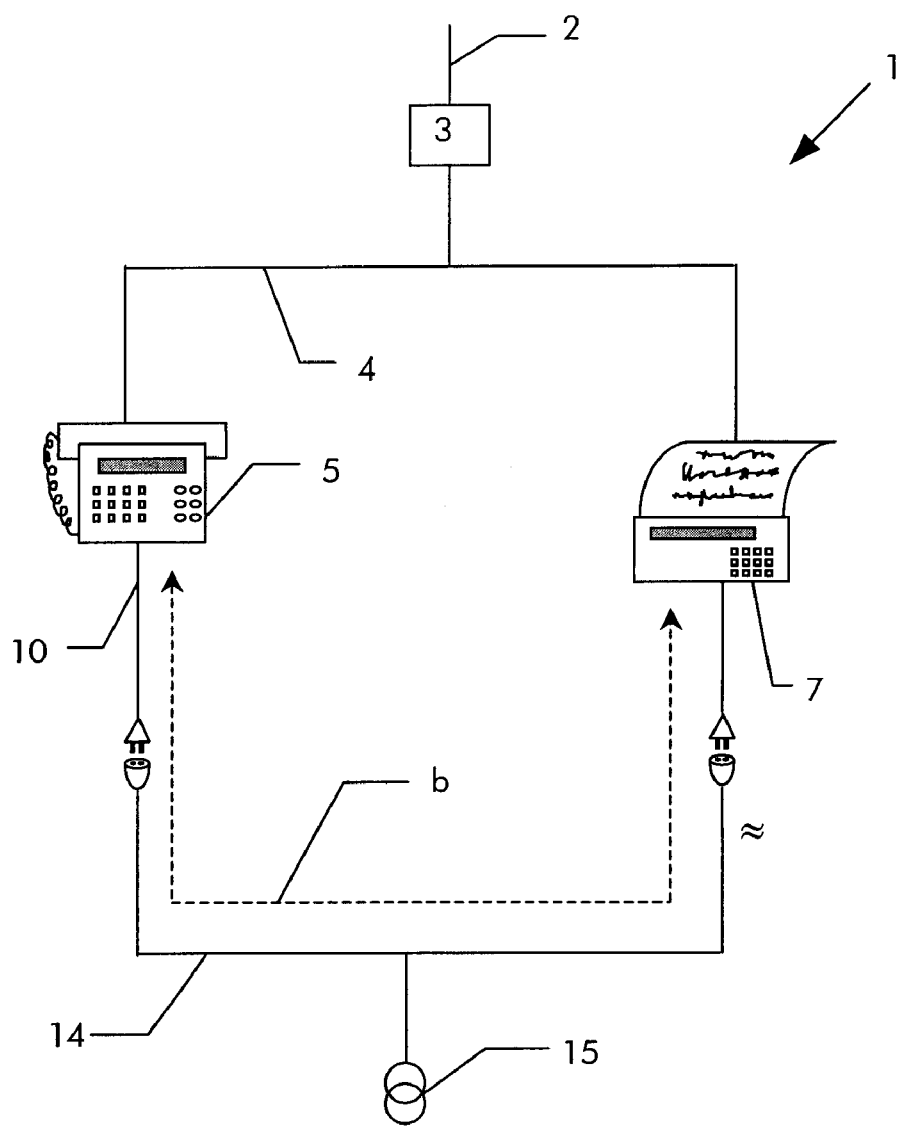
FIG. 4 is a schematic of a second variant of the telecommunications network of FIG. 1.

Alternatively, the subscriber at telephone 5 can determine, for example, the status of the fox machine 7, see FIG. 4. To do this, the subscriber will enter the individual identification number of the fax machine 7 through the keypad 30, thus establishing a call "b" to the fax machine 7 over the power line 14.

The subscriber at telephone 5 can thus interrogate the fax machine 7 for operating data and/or change this data via the keypad 30.

The same applies analogously to the telecommunications terminal 6, which is implemented as a computer (FIG. 1). The subscriber at telephone 5, which is located in one room of a building, for example, then obtains access to some operating data, e.g., to an electronic mailbox, of a computer 6 in another room. Using the control signals transferred over the in-house power line, the subscriber can thus utilize the telephone line 4 not only to transfer a call existing between him/her and a subscriber external to the network termination 3 to another telecommunications terminal 6–9 of the telecommunications network 1 but also to control these other telecommunications terminals 6–9 from a distance. He/she can both retrieve messages recorded by the telephone answering set 9 and change a recorded announcement.

The control signals "b" (FIG. 3 or FIG. 4), which are transferred over the in-house power line 14 and serve to establish a call between two telecommunications terminals 5 to 9 connected in parallel to the network termination 3, cannot leave the in-house power line 14 through an electric power meter 15, since the latter is designed not to pass these signals b to the outside. This ensures, on the one hand, that these control signals will not interfere with the supply of power and that, on the other hand, no third party can intercept them outside the in-house power line 14.

What is claimed is:

1. A telecommunications terminal connected to a network termination of a subscriber, the telecommunications terminal comprising:

an interface to the subscriber's in-house power line and addressable via an individual identification signal, and means for generating and detecting control signals which are transferred over the power line to permit the establishment of a call to a secondary telecommunications connected to the subscriber's network termination, wherein the secondary telecommunications terminal is not addressed via the individual identification signal addressed to the interface.

2. A telecommunications terminal as claimed in claim 1, wherein the control signals transfer a call existing between an external subscriber and the telecommunications terminal to the secondary telecommunications terminal.

3. A telecommunications terminal as claimed in claim 1, wherein the telecommunications terminal can access operating data of the secondary telecommunications terminal through the means for generating and detecting control signals.

4. A telecommunications terminal as claimed in claim 3, wherein said operating data controls the contents of a directory.

5. A telecommunications terminal as claimed in claim 3, wherein said operating data relate to the status of a telecommunications device operating as a fax machine.

6. A telecommunications terminal as claimed in claim 3, wherein said operating data relate to the status of, or to the messages stored in, a telecommunications device operating as a telephone answering set.

7. A telecommunications terminal as claimed in claim 1, wherein the means for generating and detecting the control signals comprise a modem that converts the control signals for transfer over the power line.

8. A telecommunications terminal as claimed in claim 7, wherein the means for generating and detecting the control signals comprise a processor that controls the modem.

9. A telecommunications terminal as claimed in claim 8, wherein the generation and detection of the control signals is controlled by the processor in accordance with an instruction set stored in a memory.

10. A telecommunications terminal as claimed in claim 9, wherein the memory is contained in a telecommunications terminal used as a data carrier.

11. A telecommunications network comprising a plurality of telecommunications terminals connected in parallel to a network termination of a subscriber, each of said telecommunications terminals having an interface to the subscriber's in-house power line and being addressable via an individual identification signal, wherein at least one of the telecommunications terminals comprises means for generating and detecting control signals which are transferred over the power line to permit the transfer of a call from the at least one telecommunications terminal to another one of the plurality of telecommunications terminals connected to the subscriber's network termination, wherein the telecommunications terminal receiving the transferred call was not initially addressed by the call.

12. A telecommunications network as claimed in claim 11, wherein the control signals cannot leave the power line.

13. A telecommunications terminal connected to a network termination of a subscriber, the telecommunications terminal comprising:

an interface to the subscriber's in-house power line and addressable via an individual identification signal, and a control signal detector and generator that generates and detects control signals that are transferred over the power line to permit the establishment of a call to a secondary telecommunications terminal connected to the subscriber's network termination, wherein the secondary telecommunications terminal is not addressed via the individual identification signal.

14. A telecommunications terminal as claimed in claim 13, wherein the telecommunications terminal can access operating data of the secondary telecommunications terminal through the control signal detector and generator.

15. A telecommunications terminal as claimed in claim 14, wherein said operating data controls the contents of a directory.

16. A telecommunications terminal as claimed in claim 14, wherein said operating data relate to the status of a telecommunications device operating as a fax machine.

17. A telecommunications terminal as claimed in claim 14, wherein said operating data relate to the status of, or to the messages stored in, a telecommunications device operating as a telephone answering set.

18. A telecommunications terminal as claimed in claim 13, wherein the means for generating and detecting the control signals comprise include a modem that converts the control signals for transfer over the power line.

19. A telecommunications terminal as claimed in claim 18, wherein the means for generating and detecting the control signals comprise a processor that controls the modem.

20. A telecommunications terminal as claimed in claim 19, wherein the generation and detection of the control signals is controlled by the processor in accordance with an instruction set stored in a memory.

\* \* \* \* \*